C. S. WEIMAR.
ACCESSORY FOR MOTOR TRUCKS.
APPLICATION FILED FEB. 21, 1921.
1,401,843.
Patented Dec. 27, 1921.
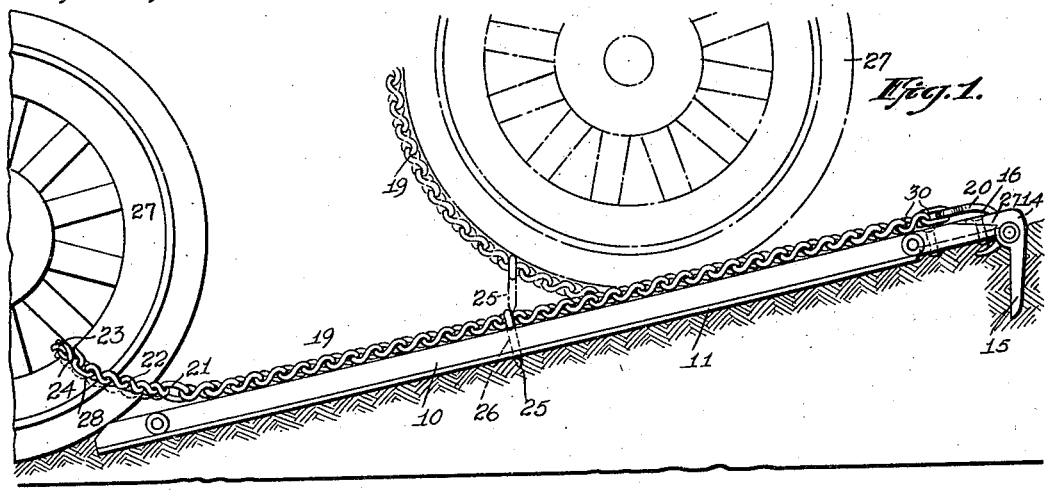
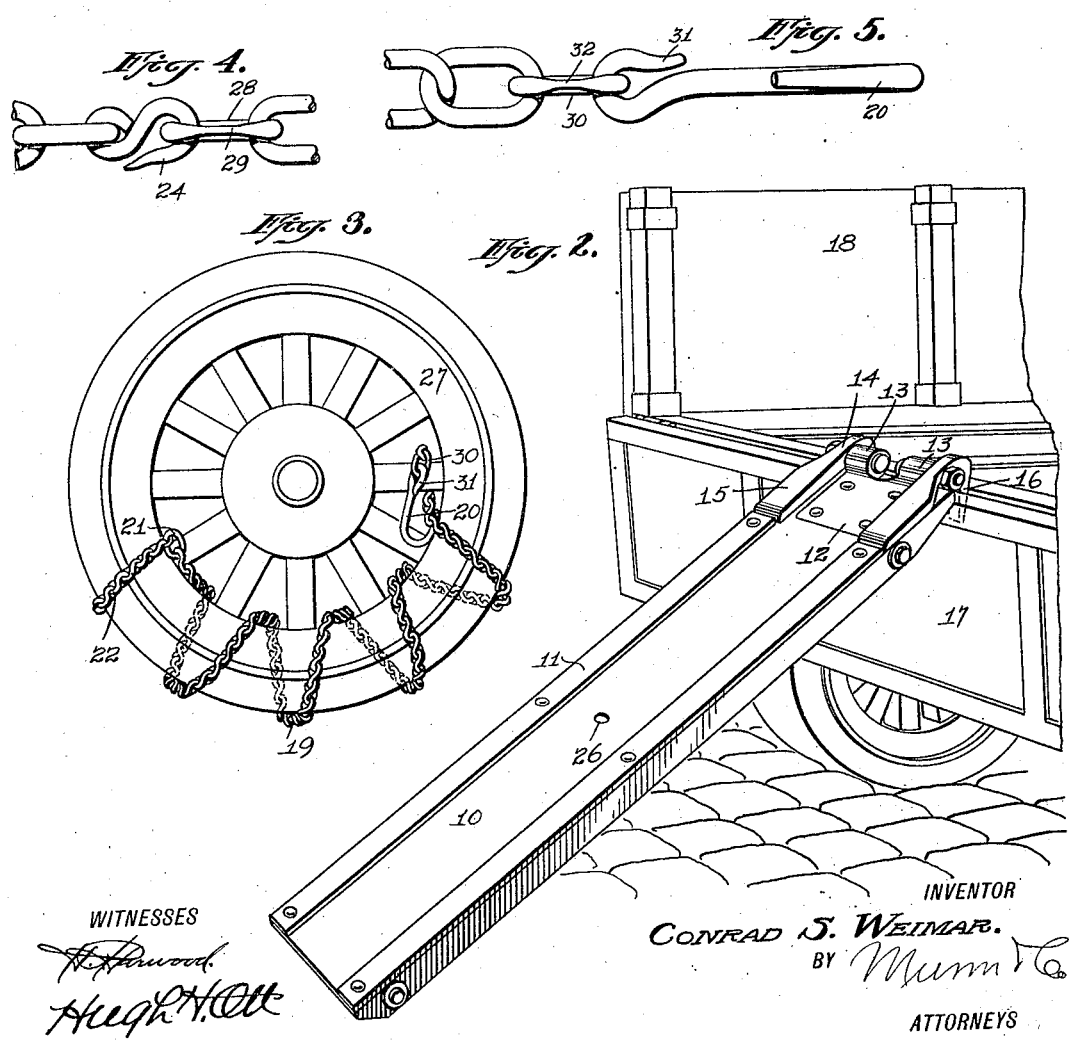
WITNESSES
INVENTOR
CONRAD S. WEIMAR.
BY
ATTORNEYS

UNITED STATES PATENT OFFICE.

CONRAD S. WEIMAR, OF ELIZABETH, NEW JERSEY.

ACCESSORY FOR MOTOR-TRUCKS.

1,401,843. Specification of Letters Patent. Patented Dec. 27, 1921.

Application filed February 21, 1921. Serial No. 446,973.

*To all whom it may concern:*

Be it known that I, CONRAD S. WEIMAR, a citizen of the United States, and a resident of Elizabeth, in the county of Union and State of New Jersey, have invented a new and Improved Accessory for Motor-Trucks, of which the following is a full, clear, and exact description.

This invention relates to an accessory for motor trucks and has particular reference to an extricating device for the purpose of extricating a vehicle which is mired or stalled.

The invention contemplates and seeks for one of its objects to produce an accessory which is capable of a number of uses and which is designed to form a part of the emergency equipment of the vehicle.

The invention further contemplates the provision of an accessory which may be respectively employed in the capacity of an extricating device, a skid board for loading or unloading the truck, a temporary skid chain, or a towing means.

A further object in view is to provide a device of the character described which will occupy a minimum amount of space when not in use and which is readily applicable and easily accessible for the various uses to which it may be adapted.

A further object of the invention is to provide a device of the character described which is inexpensive to produce, highly efficient in purpose, and strong and durable in its structure.

With these and other objects in view, some of which will appear more clearly hereafter, the invention resides in the novel construction, combination and arrangement of elements set forth in the following specification, pointed out in the appended claims and illustrated in the accompanying drawings, in which—

Figure 1 is a side elevation of the device employed in the capacity of a means for extracting a bogged or mired vehicle.

Fig. 2 is a fragmentary perspective view of the device employed as a means for loading or unloading a vehicle.

Fig. 3 illustrates the use of one of the elements in another capacity.

Figs. 4 and 5 are enlarged detail fragmentary views of several of the features of the invention.

Referring to the drawings by characters of reference, 10 designates a plank or board provided with the reinforcing or wear strips 11 secured on one face at the opposite edges thereof. One extremity of the board has secured thereto a base plate 12 provided with alined knuckles 13, to each of which is pivoted a member 14 having right angularly disposed arms 15 and 16. The arms 15 and 16 are respectively designed to coact with the opposite faces of the board to dispose said arms respectively at a right angle thereto. In its ordinary capacity the plank 10 is designed for use as a skid board for loading and unloading the truck, as illustrated in Fig. 2 of the drawings. In this capacity, the arms 15 are designed to engage and coact with one surface of the board to dispose the arm 16 at a right angle thereto, in which position said arms 16 constitute hooks which engage the tail-gate 17 of the vehicle 18.

When the device is employed in the capacity of an extricating means, the board is reversed and the hooks 16 are adapted to engage with one surface thereof, as illustrated in Fig. 1, to dispose the arms 15 at a right angle thereto, said arms 15 being designed to be driven or forced into the ground to constitute anchoring elements, the opposite end of the board being disposed immediately in advance of the drive wheel, the board being arranged in the line of travel of the vehicle. A chain 19 is provided having a hook 20 at one extremity which is designed to be engaged over the outer edge of the base 12 between the knuckles 13. The opposite end of the chain is provided with an eye 21 to which is secured the branch sections 22 and 23 to the free end of which a hook 24 is secured. The medial portion of the chain has secured thereto an eye pin 25 and the medial portion of the board is apertured as at 26 to receive the shank of said eye pin. In this use of the invention, after the hook 20 has been engaged over the outer end of the base plate 12, the eye pin 25 is positioned in the aperture 26 and the branch chain sections 22 and 23 are arranged to embrace the felly of the drive wheel 27, the hook 24 serving to retain the branch sections 22 and 23 in position. The skid board in this capacity constitutes a ramp and when the power is applied to the drive wheels 27, the chain 19 will be wound around the tire of the drive wheel and will draw or pull the same onto the board as illustrated in the dotted lines. As the drive wheel passes over the ramp the pin 25 will be lifted out of the aperture 26 and as the wheel further advances past the anchored end of the board the hook 20 will be released from the base plate 12. As illustrated in Fig. 4, the link 28 with which the hook 24 engages has one of its sides appreciably reduced as at 29 to permit of the application or removal of the hook therefrom. As illustrated in Fig. 5, the hook 20 is detachably associated with the end link 30 of the chain by the engagement of its inner hooked end 31 therewith, said hook 30 having one of its sides appreciably reduced as at 32 to permit of the application or removal of the hook extremity 31 thereto.

As illustrated in Fig. 3, the chain 19 is adapted for use as an anti-skid chain by securing the branch sections 22 and 23 around the felly and wrapping the remainder of the chain thereabout between the several spokes as shown. Preferably, two skid boards and two chains 19 constitute the equipment for each vehicle so that each skid board may be associated with each of the drive wheels to constitute a ramp when used as an extricating means. It should be further noted that the chains 19 may be connected and employed in the capacity of a towing chain when desired.

It is to be understood that the right is reserved to embodiments other than those actually illustrated herein, to the full extent indicated by the general meaning of the terms in which the claims are expressed and by variations in the phraseology of the same.

I claim:

1. An accessory for motor trucks including a skid board having a central aperture therethrough and a pivoted member at one end adapted to coact with the tail-gate for associating said end therewith when used as a loading or unloading means, said member being shiftable to operate as an anchor for anchoring the skid board to the ground to constitute a ramp when employed as an extricating means and a chain having means at its opposite extremities adapted to couple the drive wheel of the truck with the anchored end of the board for pulling the wheel over the board when power is applied to the drive wheel, and a pin carried centrally thereof for engagement within the aperture to retain the chain against lateral displacement.

2. An accessory for motor trucks comprising in combination a skid board and a towing chain, a member pivoted at one extremity of the board respectively adapted to coact with the tail-gate when the skid board is used as a loading or unloading means, said member being shiftable and adapted to coact with the ground for anchoring the board in the path of movement of the driving wheel when used as an extricating means, said chain having means at its opposite ends for securing the same respectively to the drive wheel and the anchored end of the skid board whereby upon the application of power to the drive wheel, the same will be advanced over the skid board which will constitute a ramp in this capacity to effect the extrication of the vehicle, and interengageable means at the longitudinal center of the board and chain adapted to coact to prevent lateral movement of the chain with respect thereto, said means being disengageable when the wheel passes therebeyond.

3. A motor truck accessory including a plank, a member pivoted at one extremity thereof having angularly disposed long and short arms respectively adapted to engage with the plank for holding the remaining arm at a right angle thereto whereby when the short arm is disposed at an angle to the plank the same operates as a means for engagement with the tail-gate of the truck to constitute a skid board for the loading and unloading of the same, and whereby when the long arm is disposed at a right angle thereto the same constitutes a means for anchoring one end of the plank in the ground to constitute a ramp for extricating the drive wheel, and a chain having means at its opposite ends adapted for respective connection with the anchored end of the plank and one of the driving wheels for advancing said wheel onto the board.

CONRAD S. WEIMAR.